(No Model.)

D. Y. WILSON.
WHIFFLETREE HOOK.

No. 488,491. Patented Dec. 20, 1892.

Witnesses
B. S. Ober
N. J. Riley

Inventor
David Y. Wilson,
By his Attorneys,
C. A. Snow & Co.

THE NORRIS PETERS CO., PHOTO-LITHO., WASHINGTON, D. C.

UNITED STATES PATENT OFFICE.

DAVID Y. WILSON, OF GUM TREE, ASSIGNOR OF ONE-HALF TO ENOCH P. MOORE, OF PARKESBURG, PENNSYLVANIA.

WHIFFLETREE-HOOK.

SPECIFICATION forming part of Letters Patent No. 488,491, dated December 20, 1892.

Application filed September 15, 1892. Serial No. 445,982. (No model.)

*To all whom it may concern:*

Be it known that I, DAVID Y. WILSON, a citizen of the United States, residing at Gum Tree, in the county of Chester and State of Pennsylvania, have invented a new and useful Whiffletree-Hook, of which the following is a specification.

The invention relates to improvements in whiffletree hooks.

The object of the present invention is to simplify and improve the construction of whiffletree hooks and to provide an inexpensive one which will enable a trace to be readily placed on or removed from it, and which will securely hold a trace against accidental disengagement.

The invention consists in the construction and novel combination and arrangement of parts hereinafter fully described, illustrated in the accompanying drawings and pointed out in the claims hereto appended.

Figure 1:
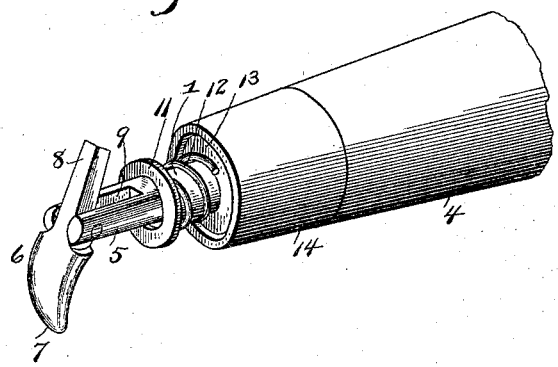
Figure 2:
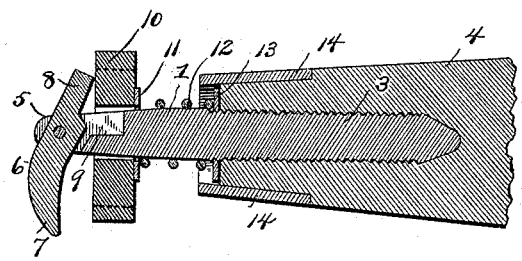
Figure 3:
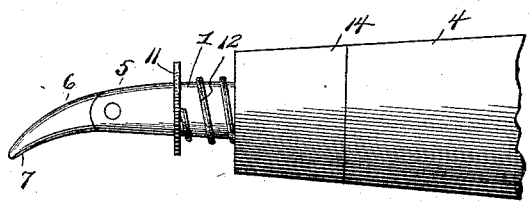

In the drawings—Figure 1 is a perspective view of a whiffletree hook constructed in accordance with this invention. Fig. 2 is a longitudinal sectional view. Fig. 3 is a side view.

Like numerals of reference indicate corresponding parts in all the figures of the drawings.

1 designates a shank having its inner portion 3 threaded and inserted in a whiffletree 4 and provided at its outer end with a bifurcated head 5 in the bifurcation of which is pivoted a tongue 6 adapted to be turned on its pivot to form an elongation of the shank to enable a trace to be readily slipped on the same, and adapted to be turned at right angles to the shank to form a stop to prevent the trace coming off the shank. The tongue has its outer portion 7 tapered and curved and adapted to form a tapered continuation or extension of the shank, whereby it may be readily inserted in the eye of a trace. The upper portion 8 of the tongue is squared, and when the tongue forms an elongation of the shank, is received in a groove or recess 9 of the shank 1. A trace 10 as illustrated in Fig. 2 of the accompanying drawings, is held close to the tongue to prevent the latter being jarred into a horizontal position, by means of a spring actuated collar 11 loosely mounted on the outer portion of the shank between the head and the whiffletree, and adapted to be pushed inward when a trace is being placed on the hook. The sliding collar 11 is secured to the outer end of a spiral spring 12 which is disposed on the outer portion of the shank 1, and which has its inner end secured to a rigid inner collar 13. The inner collar 13 is threaded, and engages the threads of the shank and is screwed on the latter, and rests against the adjacent end of the whiffletree within a ferrule 14.

It will be seen that the whiffletree hook is simple and comparatively inexpensive in construction, that it is adapted to readily receive a trace and to permit the same to be quickly removed, and that the tongue of the hook is securely held against accidental dropping and the consequent release of the trace.

What I claim is—

1. A whiffletree-hook comprising a shank, a tongue pivoted to the outer end of the same and adapted to be turned longitudinally and transversely of the shank, and a spring actuated collar loosely mounted on the exterior of the shank and adapted to hold a trace close to the tongue to prevent the latter accidentally dropping to a horizontal position, substantially as described.

2. A whiffletree-hook comprising a threaded shank, a tongue pivoted to the outer end of the shank, a collar loosely sliding on the outer portion of the shank, a threaded collar engaging the threads of the shank and rigidly connected with the latter, and a spiral spring disposed on the outer portion of the shank and interposed between the collars and having its ends secured to the same, substantially as described.

In testimony that I claim the foregoing as my own I have hereto affixed my signature in the presence of two witnesses.

DAVID Y. WILSON.

Witnesses:
J. HOOVER MCCLURE,
M. M. BAILEY.